US012718653B2

(12) United States Patent
Drennan et al.

(10) Patent No.: US 12,718,653 B2
(45) **Date of Patent: *Aug. 25, 2026**

(54) APPARATUS AND METHOD TO AUTOMATICALLY ADMINISTER MULTI-LEVEL PROGRESSIVE WAGERS

(71) Applicant: Seven Aces LLC, Brighton, CO (US)

(72) Inventors: Charles Drennan, Brighton, CO (US); Adam Daines, Red Deer (CA); Todd Taylor, Golden, CO (US)

(73) Assignee: Seven Aces LLC

( * ) Notice: Subject to any disclaimer, the term of this patent is extended or adjusted under 35 U.S.C. 154(b) by 0 days.

This patent is subject to a terminal disclaimer.

(21) Appl. No.: 17/879,764

(22) Filed: Aug. 2, 2022

(65) Prior Publication Data

US 2023/0101435 A1 Mar. 30, 2023

Related U.S. Application Data

(63) Continuation of application No. 16/512,361, filed on Jul. 15, 2019, now Pat. No. 11,403,911.

(51) Int. Cl.
*G07F 17/32* (2006.01)
*A63F 3/00* (2006.01)

(52) U.S. Cl.
CPC ........ *G07F 17/322* (2013.01); *A63F 3/00157* (2013.01); *G07F 17/3211* (2013.01); *G07F 17/3258* (2013.01); *G07F 17/3293* (2013.01); *A63F 2003/0017* (2013.01)

(58) Field of Classification Search
CPC ............. G07F 17/3258; G07F 17/3211; G07F 17/322; G07F 17/3293; G07F 17/3244; A63F 3/00157; A63F 2003/0017
See application file for complete search history.

(56) References Cited

U.S. PATENT DOCUMENTS 11,403,911 B2 * 8/2022 Drennan ............. A63F 3/00157
2017/0169667 A1 * 6/2017 Montgomery ...... G07F 17/3258

FOREIGN PATENT DOCUMENTS

GB 2503870 A * 1/2014 ........... G07F 17/322

* cited by examiner

*Primary Examiner* — Jasson H Yoo
(74) *Attorney, Agent, or Firm* — Muskin and Farmer LLC

(57) ABSTRACT

A method, system, and computer readable storage to implement a multi-denominational progressive jackpot wagering system. A color sensor is utilized to determine a color of a chip placed on a progressive wager betting area. Once the color of the chip is determined, then the denomination will be indicated on the table by lighting up a particular colored LED, and the player will be entitled to different progressive jackpot protocols based on which denomination of chip the player placed.

20 Claims, 13 Drawing Sheets

APPARATUS AND METHOD TO AUTOMATICALLY ADMINISTER MULTI-LEVEL PROGRESSIVE WAGERS

BACKGROUND OF THE INVENTION

Field of the Invention

The present general inventive concept is directed to a method, apparatus, and computer readable storage medium directed to an apparatus and method to automatically administer multi-level progressive wagers for a casino table game. U.S. application Ser. No. 16/512,361 is incorporated by reference in its entirety.

Description of the Related Art

Casino table games (for example, blackjack, THREE CARD POKER, CARIBBEAN STUD POKER, etc.) receive a main wager from the player (in the form of chips) and the if the player wins the game the player is paid a payout on the main wager and if the player loses the game then the player loses the main wager. In order to generate more revenue and also generate more excitement for players, casino table games can optionally offer side wagers, which typically offer bets with a high variance and is resolved based on some discrete predetermined criteria (e.g., the rank of a poker hand formed from cards dealt, whether a particular card combination is formed (e.g., three sevens), etc.) Progressive jackpots are also offered as side bets in which the payouts are not predetermined and static but are based on a progressive jackpot pool. For each wager that is place, all or a portion of that wager is contributed to the progressive jackpot pool (and the remainder is typically kept by the house as profit). When a player achieves a combination which entitles him/her to win the progressive jackpot, the entire amount of the progressive jackpot is awarded to the player. In this manner, the amount players can win for achieving a "longshot" type of combination (e.g., being dealt a royal flush, etc.) will continuously grow larger as people play the progressive wager, until somebody wins it (by getting the predetermined combination) upon which the amount in the progressive jackpot is reset to a "seed" amount.

SUMMARY OF THE INVENTION

It is an aspect of the present invention to provide an improved progressive wagering system.

These together with other aspects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

Further features and advantages of the present invention, as well as the structure and operation of various embodiments of the present invention, will become apparent and more readily appreciated from the following description of the preferred embodiments, taken in conjunction with the accompanying drawings of which.

DESCRIPTION OF THE PREFERRED EMBODIMENTS

Figure 1:
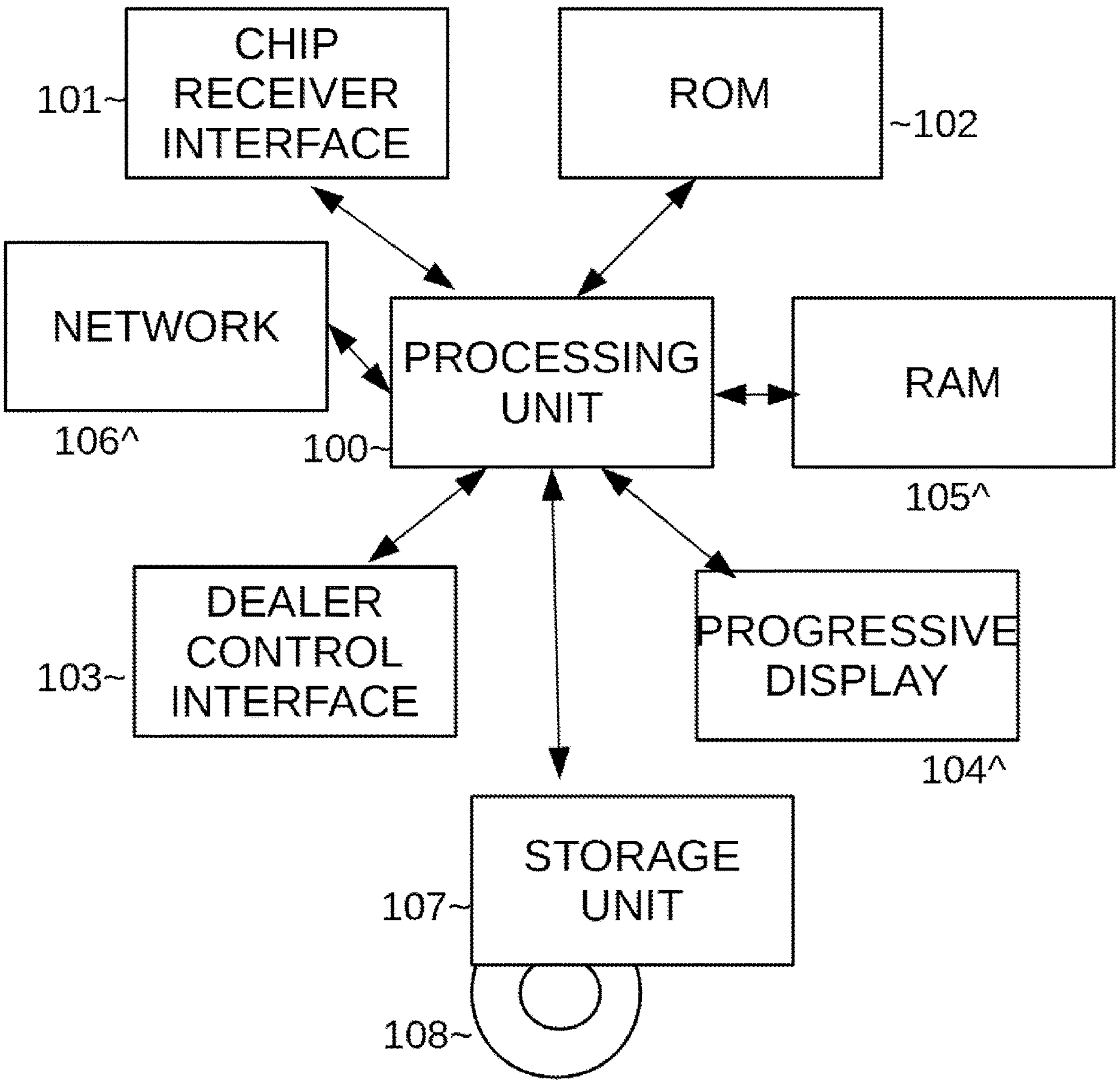
FIG. 1 is a block diagram of a components of a bet detection and administration system, according to an embodiment.

Reference will now be made in detail to the presently preferred embodiments of the invention, examples of which are illustrated in the accompanying drawings, wherein like reference numerals refer to like elements throughout.

The general inventive concept relates to a system for administering a progressive jackpot wager (also referred to as "progressive wager") as part of a casino table game, and enables different players at the same table to wager different amounts on the progressive jackpot wager (note that the progressive jackpot wager is a type of "side bet" or "side wager"). Players at each table are typically required to play the main wager in order to stay at the table position. Players can optionally play a progressive wager (also referred to as progressive jackpot wager or progressive jackpot or progressive wager). Players can choose whether or not to play the progressive wager (i.e., place a wager on the progressive wager before the next game begins) and if the player decides he/she wishes to play the progressive the player can also choose how much to bet on the progressive wager (e.g., $1 or $5). The player can choose to place a white chip ($1) or a red chip ($5) on the progressive wager. If the player chooses to bet $5 on the progressive wager, then the player would be entitled to a greater expected value on the progressive wager (for example around five times greater) than the expected value the player would receive if the player bet $1 on the progressive wager.

The system can automatically detect the denomination of wager the player placed on a progressive wager betting area (which can be a circle or any shaped area), for example by detecting the color. It is standard in most countries that $5 chips are red and $1 chips are white. Thus, a color sensor can detect the color of chip that is placed on a bet administration unit and the system can automatically display the denomination (for example by displaying a white light on or near the bet administration unit if a white chip was placed and a red light on or near the bet administration unit of a red chip was placed). In addition, the system can automatically administer the progressive wager based on the denomination that was placed. For example, if a $1 chip was placed as the progressive wager then a $1 progressive jackpot pool could be used, and if a $5 chip was placed as the progressive wager then a different $5 progressive jackpot pool could be used. In this way, players who are at the same table can simultaneously choose to bet different amounts on the progressive wager yet be compensated appropriately based on the amount of their respective wager.

FIG. 1 is a block diagram of a components of a bet detection and administration system, according to an embodiment.

A processing unit 100 can be a microprocessor and any associated structure (power supply, cache, bus, etc.) The processing unit 100 can be connected to a chip receiver interface 101. The chip receiver interface 101 connects to a plurality of bet administration units. There would be one bet administration unit for each player at the table. In other words, each player has a main wager betting circle (to place the main wager) and a progressive (side) wager betting circle (to place the progressive wager). Each progressive wager betting circle would have its own bet administration unit which would automatically detect the denomination the player placed in the progressive wager betting circle, light up a respective light corresponding to the denomination the player, and communicate this information to the processing unit 100. The chip receiver interface 101 interfaces with all of the bet administration units and receives all of the relevant information (whether a chip is placed in the progressive wager betting circle and its denomination) and communicates it to the processing unit 100 for further processing.

The processing unit 100 is also connected to a ROM 102 which can store programs and information to operate the system (e.g., an operating system, initialization routine, etc.) The processing unit 100 is also connected to a RAM 105 which can be used as working memory for any purpose needed. The processing unit 100 can also be connected to a progressive display 104 which displays information to the players including how much each progressive jackpot pays. The processing unit 100 can also be connected to a storage unit 107 (e.g., hard disc drive, EPROM, flash memory, solid state memory), which can read a computer readable storage medium (e.g., hard disc, memory chips, etc.) which can store a computer readable program which can instruct the processing unit 100 to implement any and all of the methods/features described herein. Note that other computer(s) can also be used in conjunction to perform any and all of the methods/features described herein and can be connected to the structure illustrated in FIG. 1 via the network connection 106. One or more such computer readable storage mediums can be utilized individually or in conjunction and can store one or more computer readable programs programmed to perform any and all of the methods/features described herein, which when executed, would result in one or more computer(s) implementing any and all of the methods/features described herein. The processing unit 100 can also be connected to the network connection 106 which can connect to any type of computer network (e.g., LAN, Bluetooth, etc.) which can then connect to any other computer which is part of the system (such as a casino computer/database, etc.)

The processing unit 100 is also connected to a dealer control interface 103 (illustrated in FIG. 5) and enables the dealer to input some parameters regarding the progressive jackpot to the processing unit 100.

Figure 2:
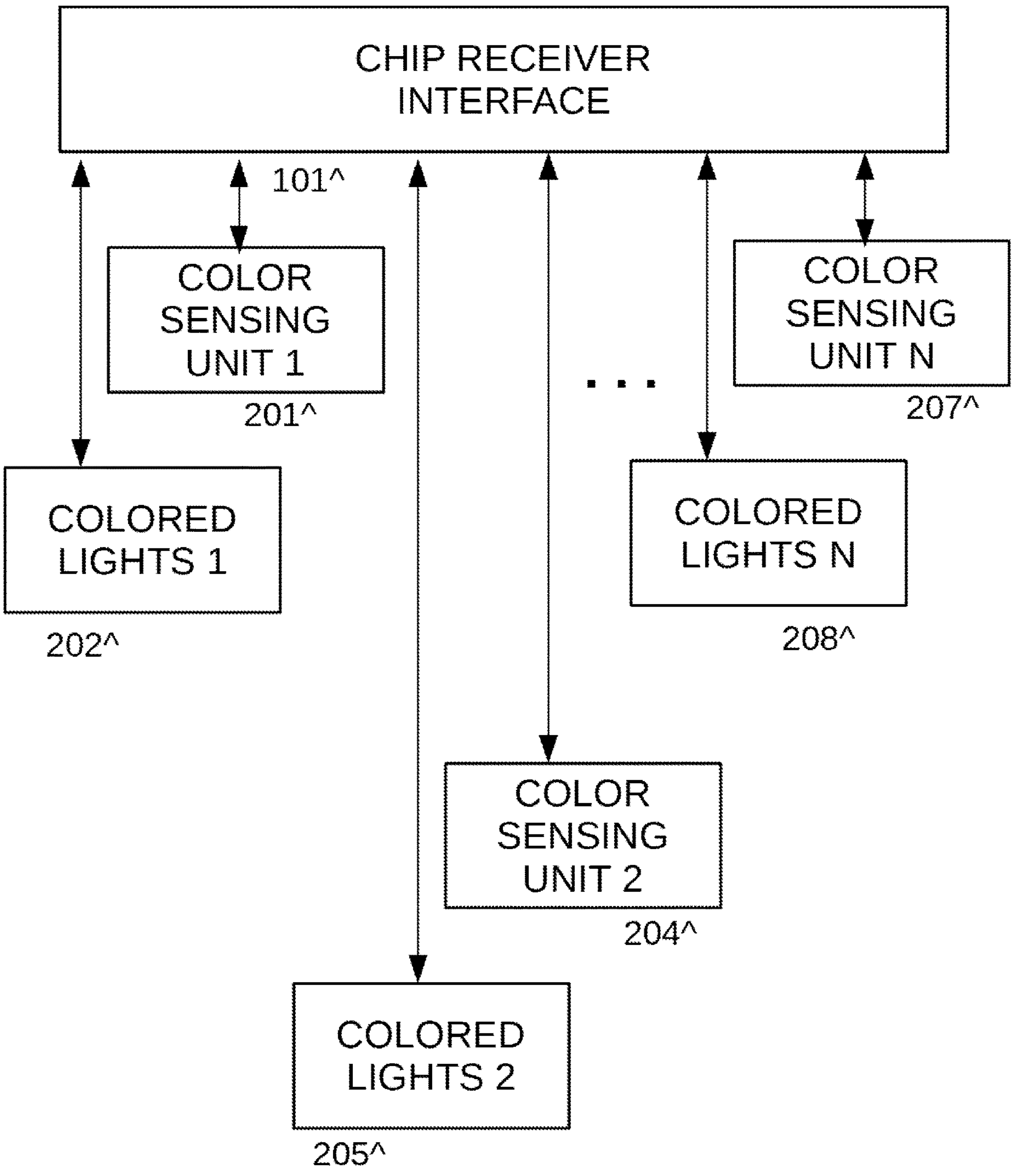
FIG. 2 is a block diagram showing an example of the chip receiver interface and a set of bet administration units, according to an embodiment.

FIG. 2 is a block diagram showing an example of the chip receiver interface and a set of bet administration units, according to an embodiment.

A chip receiver interface 101 connects to the processing unit 100, and also connects to each of a plurality of bet administration units. The chip receiver interface 101 can use any type of communication protocol such as I2C bus or any other. Each bet administration unit is identical and comprises a color sensing unit (201, 204, . . . 207) and a set of colored lights (202, 205, . . . 208). There should be as many bet administration units at a table as there are progressive wager betting circles. So in other words, bet administration unit 1 comprises color sensing unit 1 201 and colored lights 1), bet administration unit 2 comprises color sensing unit 2 204 and colored lights 2 205, and so on, until bet administration unit N comprises color sensing unit n 207 and colored lights n 208. A typical casino table might have seven such bet administration units for seven different betting areas (each comprising a main wager betting circle and a progressive wager betting circle) which can accommodate seven simultaneous players.

The color sensing unit (color sensor) can comprise an off the shelf color sensor (e.g., TAOS TCS 3472 color light-to-digital converter with IR filter) available from TEXAS ADVANCED OPTOELECTRONIC SOLUTIONS, CQRobot Raspberry Pi/Arduino/STM32 TCS34725FN RGB Color Sensor) or any others which are available off-the-shelf and can be relatively inexpensive. The color sensing unit can be configured to detect the presence/absence of a chip by measuring the intensity of light (if there is low light levels then a chip (or other opaque object) is placed on the progressive wager betting circle, while if there are high light levels then there is nothing placed on the progressive wager betting circle. Calibration of the system would be required to identify the proper ranges of light intensity levels which would correspond to the presence/absence of a casino chip (typically made of hardened clay and painted over with a color). The color sensor can also return RGB levels of a color that is detected/sensed from an object directly above the color sensor. A plurality of color sensors can be used and placed in various locations directly under the progressive wager betting circle in order to take an average value of the RGB values which may result in a more accurate RGB reading. Note that depending on the color sensor being used, instead of RGB (red, green, blue) it could also return HSL (hue, saturation, lightness), or a wavelength of light detected. It is well known in the art to take any of these values and determine what color was actually detected.

For example, if the color sensor returns RGB, it is a well known formula to convert this to HSL values (and convert from HSL to RGB and other formats as well). Once the HSL values are known, then it is well known how to determine whether the HSL values represent a particular color. For example, given HSL values, it can be determined that they represent the color red if the hue (H) is between 320 to 360 or 0 to 25, and S>35 and L>35. Of course all of these values can be adjusted and calibrated accordingly and just serve as one example. If the values known are in RGB format, then it can be determined if it is a particular color (e.g., red) if the R value is greater than both the G and B values and the result of (R−((G+B)/2))>X, where X is a constant that can be adjusted (e.g., 50). So, for the detected color to be considered a particular color, the color is quantified (and converted to a particular format if necessary) and then those values must meet a set of predefined criteria in order to considered that color for purposes of detection (since whether a particular colored chip is detected is typically a binary yes/no result). The presence of white can be determined by computing d=the highest RGB value minus the average of the two lowest RGB values, and if d<w (constant) and the highest RGB value >t (constant) then it can be concluded that white is detected but if these criterion are not met then it is concluded that white is not detected. The constant w can be 30 (or other value) and the constant t can be 200 (or other value). Thus, the conclusion that a particular color is detected is made by starting with the outputs from the color sensor, converting it (if necessary) to another format, and then comparing whether those values fit into a mathematical definition (e.g., range, greater than a value, less than a value, etc.) which define a particular color (e.g., red, green, etc.) or shade (e.g., white).

The presence/absence of a chip (or anything covering the progressive wager betting circle) can be determined by examining the values returned by the sensor to determine if there is a high level of light or a low level of light above the color sensors. For example, in HSB format (which can easily be converted to/from RGB and HSL format by known formulas), if B (brightness) is smaller than 1, where 1 is a constant (e.g., 15) then it is determined that something opaque is blocking the color sensor, and if B is not smaller than 1 (e.g., >=1) then something is not block the color sensor and hence there is no chip placed on the progressive wager betting circle.

Alternatively, the presence/absence of a chip can be detected by utilizing a simple photosensor (instead of a more complex color sensor) in the center of the progressive wager betting circle to determine the presence/absence of a chip (or other object) on the progressive wager betting circle. If there is at least a predetermined level of light detected by the photosensor then it is concluded no chip is present on the progressive wager betting circle but if there is less than the predetermined level of light detected by the photosensor then it can be concluded that a chip is present on the progressive wager betting circle. In this embodiment, once the presence of a chip is determined using the simple photosensor, then the more complex color sensors can be activated to detect the color of the chip.

In an embodiment utilizing, for example, the TAOS TCS3472 (mentioned above), this (off the shelf) sensor combines both a white LED to illuminate the detected object (e.g., chip) so its color can then be reflected and measured accurate along with a RGBA sensor (red, green blue, ambient light) which are each (e.g., red, green blue, ambient light) reported as 16 bit values. Only one such TAOS TCS3472 is needed for each progressive wager betting circle for accurate detection, although (as described herein) more than one can be used to improve accuracy if desired. Thus, the TAS TCS3472 is used to both detect chip presence/absence as well as chip color. If a single such sensor is used it can be placed in any location under the surface 417 which has a line of sight to the colored portion of the bottom of each chip placed in the respective betting circle (e.g., see FIG. 4A).

The colored lights 1 202 would typically comprise a white light (representing a $1 white chip bet) and a red light (representing a $5 red chip bet). Each of the colored lights units (202, 205, . . . , 208) would be identical (just as the color sensing units (201, 204, . . . 207) would be. Of course, the colored lights could utilize any other colors as well and could use more than two colors as well. The lights would typically be LEDs (e.g., a white LED and a red LED).

.Note that a light ring can serve as the colored light unit which is also referred to as colored lights 1 202 (and each set of colored lights used for each progressive wager betting circle (e.g., 202, 205, 208 . . . and 302,305, 308, . . . etc.) The light ring is also an off the shelf component which comprises a set of LEDs (e.g., 12, or 1-16 (or more)), which can all selectively be lighted and unlighted. Each of the LEDs in the light ring can be a RGBW LED (an RGBW LED is a set of four LEDS (red, green, blue, white) all in close proximity which can itself generate millions of colors by combining different intensities of the individual LED colors. A light ring can also be made from off the shelf RGBW light strips but shaping the strip into a ring (circular) shape. An example of an off the shelf RGBW LED strip is ADAFRUIT NeoPixel Digital RGBW LED Strip, although many others are available.

Using a light ring for the colored lights has the advantage that many effects can be implemented. For example, if the player bets a red (typically $5) chip then the entire light ring can illuminate red to match the color of the chip. If the player bets a white (typically $1) chip then the entire light ring can illuminate white to match the color of the chip (this matching of the light ring color can be done to match the color of any colored chip). Upon a winning wager, the light ring (surrounding the chip which has won) can glow, flash, etc., in a pattern to attract attention to designate a winner.

The light ring can also be used to convey information in addition to the denomination of the chip placed therein. For example, the system described herein can also be used to detect counterfeit chips. A counterfeit chip may not have the correct color as a genuine chip. Thus, the color sensor would detect the color of the chip and check that the color data/values (e.g., RGB values, hue, etc.) would be in a predetermined range. There would be a plurality of such predetermined ranges for each genuine denomination the chip comes in (e.g., white, red, green, etc.) The predetermined ranges would be determined/calibrated for each particular casino before the system is employed, which would include identifying the acceptable range of color data/values by analyzing colors of current casino chips. A chip is placed in the respective betting circle and its color values are detected therein. If the color values detected fall within one of the predetermined ranges (or other designation of acceptable values) then it is determined that the chip is genuine. Even genuine chips may not have the exact same color (due to variations in the manufacturing process, wear and tear over time, etc.) and so the range of values would account for all such discrepancies. If a chip is placed and its color values are detected to be outside of all possible ranges (e.g., it is not an acceptable white chip, it is not an acceptable red chip, etc.) then the chip can be flagged as a counterfeit chip. Once flagged (determined) to be counterfeit, a number of alarm triggers (alerts) can take place. Casino security can automatically be notified, an instant message (or email) or other such message can be automatically transmitted to a casino employee for further investigation. In addition, the light ring can illuminate in a manner to denote that the chip placed therein has been detected to be counterfeit (for example, the light ring can glow yellow or it can alternate between flashing red and white thereby indicating there is a problem with the chip placed therein). However, if a placed chip is determined to be in one of the predetermined ranges (e.g., it is determined to be a white chip, or it is determined to be a red chip, etc.) then no alarm (alert) is triggered because the chip therein is genuine (not counterfeit). Note that the predetermined ranges for different colors are typically exclusive, that is, it would not be possible for a chip to fall into different ranges (for different colors) at the same time, as this would mean a chip is two different colors at the same time (for example a chip cannot be green and red at the same time). However, there can be multiple ranges for the same color (e.g., different shades of red) and it may be possible that there is some overlap between predetermined ranges and a chip can fall into more than one range of values for the same color. What is important is that there are discrete criterion for color of genuine chips (notwithstanding the actual colors may vary) and if chips are outside of these criterion it is determined that the color of the chip cannot possibly be from the casino where the casino table (containing the light sensor/detector), for example the shade of green for the placed chip is not a shade of green that could be possible from a green chip at that casino.

In one embodiment, the chip colors that would not trigger an alert would only be the possible chip colors that are allowed to be played on the progressive side wager where the color sensor is. For example, in an embodiment, only white and red chips are allowed to be placed therein, and any other color (e.g., green, black, etc., which are genuine chip colors) would trigger an alert. In another embodiment, all genuine chip colors (whether allowed to be placed on the betting circle therein or not) would not trigger an alert (so a casino could have white, red, green, black, purple chips and even though only white and red chips would be allowed to be placed on the progressive wager betting circle so long as a valid (e.g., white, red, green, black, purple) chip is placed therein the alert would not be triggered since the chip is not detected as counterfeit).

In a further embodiment, there can be two types of alerts, one for betting a chip denomination which is not allowed on the game (e.g., progressive wager circle) and another alert when someone uses a counterfeit chip. For example, if the game only allows white and red chips to be placed on the progressive wager betting circle, then if a player places a chip (which is not detected as counterfeit) but is another color aside from white and red then a "denomination alert" would trigger indicating the player is placing the wrong type of chip. The denomination alert could simply be a glowing light pattern on the light ring to indicate to the player (who placed the erroneous wager) and dealer that an erroneous bet amount was placed (e.g., a black ($100) chip when black chips are not allowed to be placed on the progressive wager betting circle). A "counterfeit alert" would be generated when the chip placed therein is not a valid color of any of the casino's chips (it does not matter if the chip placed therein is red and red chips are allowed to be bet therein). If the chip placed therein is not within an acceptable range of color values for all of the casino's types (denominations) of chips, then it is determined that the chip placed therein is counterfeit and a counterfeit alert is triggered. A counterfeit alert could be any one or combination of: messaging (text, email, etc.) the casino's security, alerting the pit boss (e.g., by automated phone call), illuminating the light ring in a special light pattern indicating a counterfeit chip, etc.

The presence/absence of a chip would be transmitted by each color sensing unit through the chip receiver interface 101 to the processing unit 100. The processing unit 100 would then determine which (if any) light of the colored lights to light up. For example, if in bet administration unit 1 the color sensing unit 1 201 determines that a chip is present and that the chip is white color, then the processing unit 100 would cause a white light of the colored lights 1 202 to light up. If the color sensing unit 1 201 determines that a chip is present and that the chip is red in color, then the processing unit 100 would cause a red light of the colored lights 1 202 to light up. If no chip is detected then the processing unit 100 would cause no light of the colored lights 1 201 to light up.

For a table that can simultaneously seat six players, then there would be six bet administration units which would comprise at least each respective color sensing unit and colored lights. The color values (e.g., RGB values, wavelengths, or whatever values the sensing units natively detect and transmit) from the color sensing units 201, 204, . . . 207 are transmitted to the processing unit 100 via the chip receiver interface 101. The processing unit 100 then processes (analyzes) the color values (e.g., determines the presence/absence of a chip and which color it is) and then causes an appropriate light in the respective colored lights to light up. Of course, the colored lights would only light accordingly based upon the results of the color sensing unit in the same bet administration unit. In other words, for each player, only their own bet affects the way the lights in the colored lights light up but is not affected by other players' bets (since one bet administration unit is associated with its one respective progressive wager betting circle). Note that "bet" and "wager" are used herein synonymously.

Table I below represents a set of determinations and triggered outcomes in the colored lights. Note that if a chip is detected but the chip is not detected as a white chip or a red chip, then this is an error (e.g., the player placed another type of chip (e.g., green) or another object on the progressive wager betting circle) and the error can be indicated by lighting up both LEDs. Alternatively, such an error can be indicated by lighting up none of the LEDs, or a third LED (e.g., blue) can only be lit up in case of such an error.

TABLE I

| Condition | Resulting Action |
|---|---|
| Chip absent | no light lit |
| Chip present, white determined | light only white LED |
| Chip present, red determined | light only red LED |
| Chip present, color other than white and red determined | light both white and red LEDs |

Figure 3:
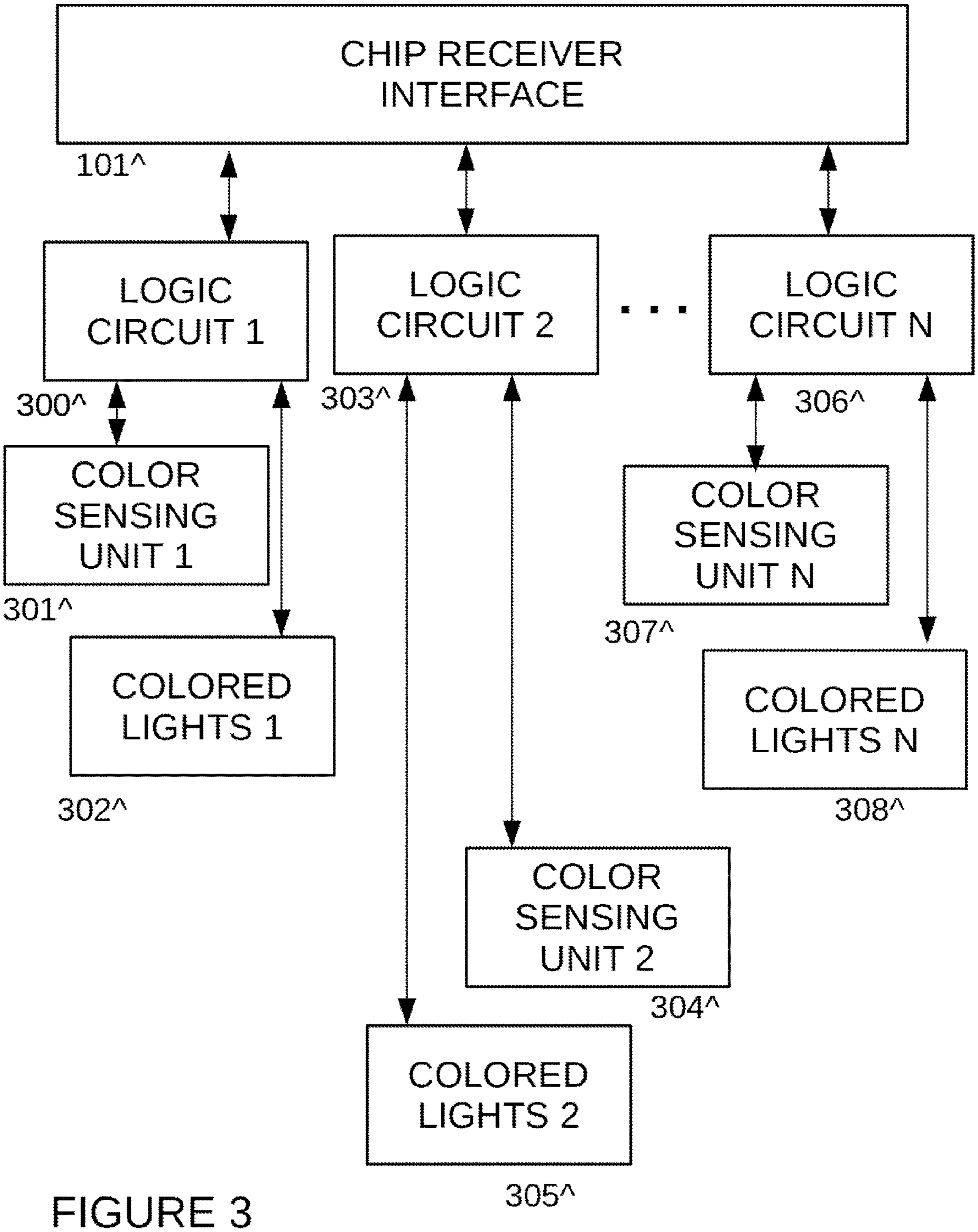
FIG. 3 is a block diagram showing another example configuration of the chip receiver interface and respective bet administration units, according to an embodiment.

FIG. 3 is a block diagram showing another example configuration of the chip receiver interface and respective bet administration units, according to an embodiment. FIG. 3 is an alternative embodiment to FIG. 2.

FIG. 3 operates similarly to FIG. 2, however, each bet administration unit also includes its own logic circuit which determines which LEDs to light up in the respective colored lights. Thus, in FIG. 2 transmits the signals from the color sensing units to the processing unit 100 for processing and then the processing unit 100 determines (and causes) which LEDs to light up in each respective colored lights. In FIG. 3, instead of the processing unit 100 determining which lights (if any) in the respective colored lights to light up, the bet administration unit's own logic circuit (300, 303, . . . 306) would make this determination and then cause the appropriate LED (if any) to light up in the colored lights. The logic circuit would still transmit the status (e.g., chip present/absence and the determined color) to the processing unit 100 so the processing unit 100 can still process the transaction properly (e.g., adjust the progressive jackpot pools, etc.)

Each logic circuit (300, 303, 306) would be identical (in fact each bet administration unit on each table should be identical) and can contain a programmable logic array (PLA), or its own microcomputer (e.g., microprocessor, RAM, ROM, etc.) which can be programmed in order to carry out the task of inputting the outputs from the respective color sensing unit, determine the presence/absence of a chip and the color (if a chip is presence), lighting up the proper LED out of the respective colored lights, and communicating the information (presence/absence of a chip, and the color) to the processing unit 100.

Bet administration unit 1 comprises logic circuit 1 300, color sensing unit 1, 301, and colored lights 1 302, bet administration unit 2 comprises logic circuit 2 303, color sensing unit 2 304, colored lights 2 305, and so on, and then bet administration n comprises logic circuit n 306, color sensing unit n 307, and colored lights n 308.

Note that each bet administration unit illustrated in FIGS. 2 and 3 may not show the entire unit and additional components may be utilized, such as a power supply, additional connections, converters, etc.

Figure 4A:
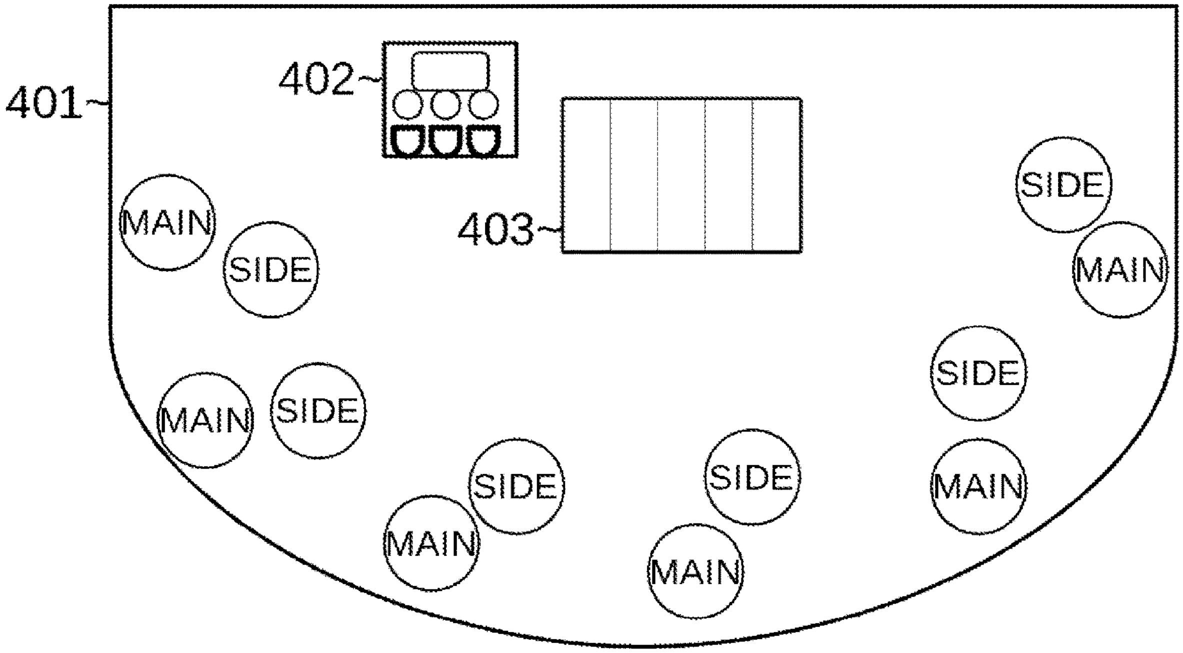
FIG. 4A is a drawing of an example physical table utilized in a casino which can accept progressive side bets, according to an embodiment.

FIG. 4A is a drawing of an example physical table utilized in a casino which can accept progressive side bets, according to an embodiment.

A physical casino gaming table has a chip rack 403 in which the dealer stores the dealer's chips (which are used to pay player winning wagers and take player losing wagers). A dealer administration unit 402 is used for the dealer to input parameters to the system (which is discussed herein in more detail). This table 401 accommodates six players, although such a table can accommodate any other reasonable number of players as well (e.g., 5 to 10). There are six player betting areas, each such betting area comprising a main wager betting circle (for placing the main wager) and a side (progressive) wager betting circle for placing the progressive wager which can be progressive wager betting circle 450 from FIG. 4B. There is one bet administration unit for each side wager betting circle.

Figure 4B:
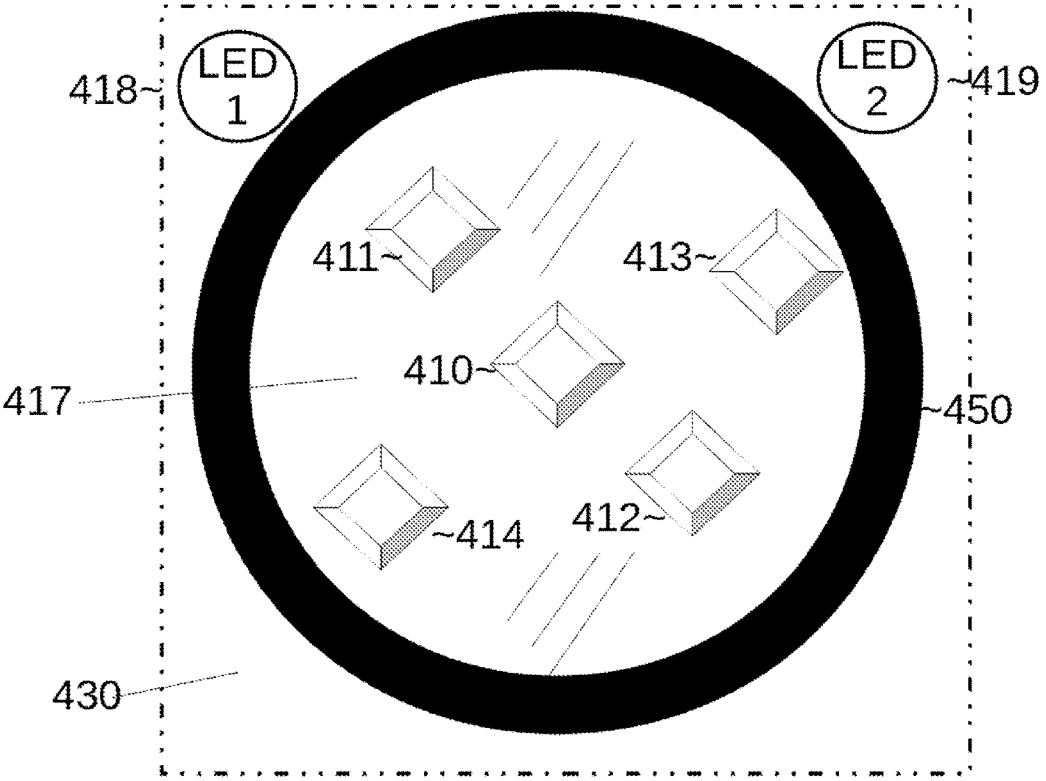
FIG. 4B is a top view drawing illustrating a bet administration unit without a chip on it, according to an embodiment.

FIG. 4B is a top view drawing illustrating a bet administration unit without a chip on it, according to an embodiment.

The side wager betting circle 450 (also referred to as the progressive wager betting circle or progressive wager betting circle) has a surface 417 of glass (or plastic or other transparent material) top where a chip would be placed on it. A first LED 418 can be a first color (e.g., white, red, or other color) and a second LED 419 can be a second color (e.g., white, red, or other color) but the second color would typically not be the same as the first color. A bet administration unit 430 comprises the LEDs 418, 419, and the electronics under the betting circle including the color sensors 411, 412, 413, 414. Note that LEDs 418, 419 can be replaced with the light ring described herein (which would comprise more LEDs than just two).

Note that there can be only one color sensor inside the bet administration unit 430 in order to sense the color values which is used to determine the actual color of the chip. Note that in an embodiment, more than one color sensor can be used to generate a more accurate determination of color. More than one color sensor can be used by average the values generated therein, or by determining the color using the values generated by each color sensor and then "voting' among the color sensors and determining the color as the one with the greatest number of "votes."

Typically, casino chips may be white on the center and colored on the perimeter. Therefore, it would be preferable to place the color sensors on the perimeter of the betting circle. For example, if one color sensor is used, it would ideally be placed on the perimeter such as color sensor 413 or color sensor 414. If two color sensors are used they can preferably both be located on the perimeter 413, 414.

Note that the center of the progressive wager betting circle is not an ideal placement for a color sensor because in some casinos the center of a chip is always white, in the embodiment which uses a simple photosensor 410 to detect the presence/absence of a chip, then this photosensor 410 can be located in the center of the progressive wager betting circle. The photosensor 410 would sense the intensity level of light and could be used to simple determine whether a chip is placed on the progressive wager betting circle (if the sensed light level by the photosensor 410 is below a predetermined constant) or if there is no chip placed on the progressive wager betting circle (if the light level sensed by the photosensor 410 is not below the predetermined constant). If the photosensor 410 determines that there is a chip present, then the color sensor(s) could be activated to cause the color to be determined. Note that a color sensor (instead of the photosensor 410) can also be used in the center and can serve the function of detecting the level of light to determine whether a chip is placed (but not the color since some casino chips have white in the center).

Note that the color sensors 411, 412, 413, 414 would typically not be directly contacting the surface 417 because if there is no light at all allowed between the chip 420 and the color sensors 411, 412, 413, 414 then it might be difficult for the color to be detected. As such, a small amount of ambient light should be permitted in order to enable accurate color determination.

Figure 4C:
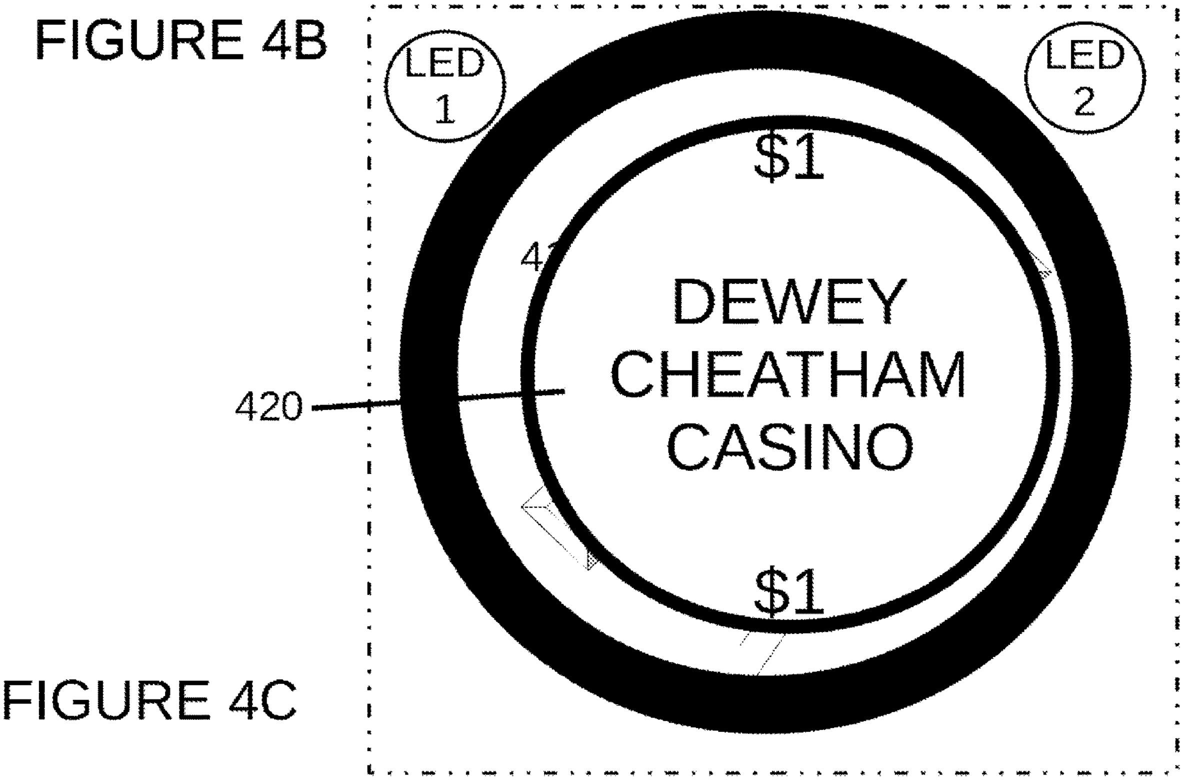
FIG. 4C is a top view drawing illustrating a bet administration unit with a chip placed on it, according to an embodiment.

FIG. 4C is a top view drawing illustrating a bet administration unit with a chip placed on it, according to an embodiment.

A white chip 420 is placed on top of the progressive wager betting circle. This blocks light entering the bet administration unit and the color sensors 411, 412, 413, 414 and/or the photosensor 410 can detect the presence of a chip and detect its color values which is used to determine its actual color.

Figure 4D:
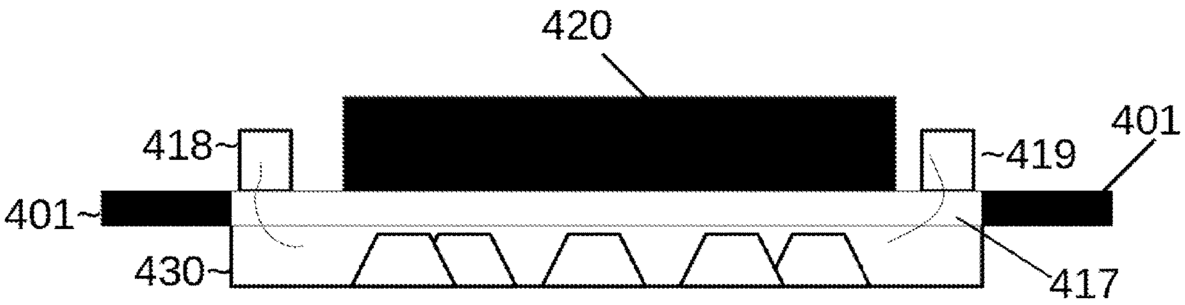
FIG. 4D is a side view drawing illustrating a bet administration unit with a chip placed on it, according to an embodiment.

FIG. 4D is a side view drawing illustrating a bet administration unit with a chip placed on it, according to an embodiment.

The table surface 401 is shown with the transparent top surface 417 of the bet administration unit 430 coming between the table surface 401 so the color sensors can get an unobstructed line of sight through the top surface 417 of the bet administration unit 430 to the chip 420.

Figure 5:
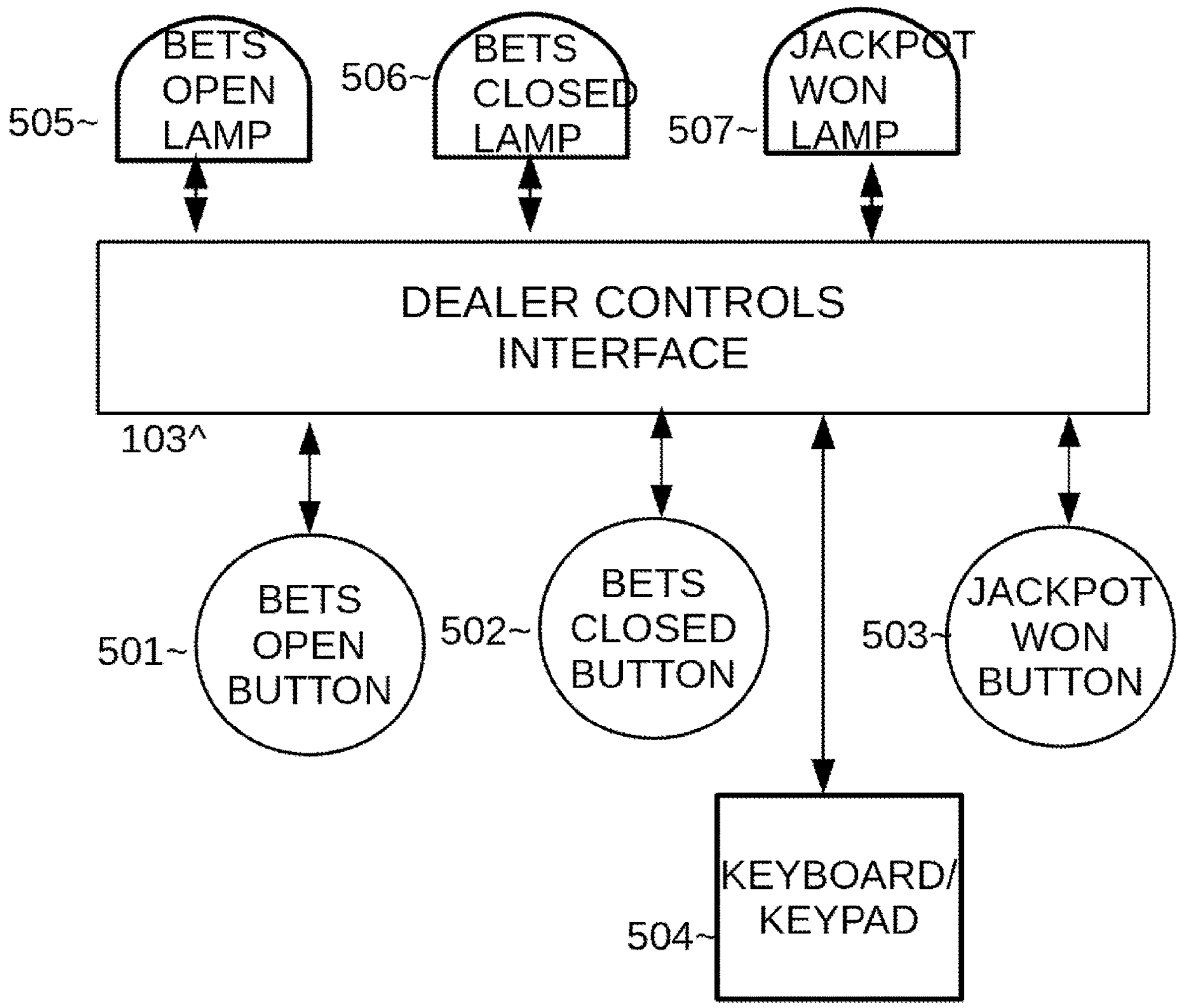
FIG. 5 is a block diagram showing a dealer administration unit, according to an embodiment.

FIG. 5 is a block diagram showing a dealer administration unit, according to an embodiment.

The dealer controls interface 103 is connected to the processing unit 100 and connects to a plurality of inputs and outputs used by the dealer. The dealer controls interface 103 can be an I2C bus or any other appropriate protocol which can be used to illuminate particular lights 505, 506, 507 (upon direction of the processing unit 100) and transmit dealer button presses of buttons 501, 502, 503 and dealer entries on a keyboard/keypad 504 to the processing unit 100.

A bets open lamp 505 lights up when the table is in the bets open mode (operation 600), a bets closed lamp 506 lights up when the able is in the bets closed mode (operations 601, 602, 603, 604, 605, 606), and a jackpot won lamp 507 when a player has won a progressive jackpot (operation 605). The bets open mode is when players are currently placing their wagers before a game begins. The player is free to place a progressive wager (chip) on the progressive wager betting circle as can even change his/her mind and remove the chip placed so long as the table is still in the bets open mode. In the bets closed mode, the player must not touch or remove his/her chip placed on his/her progressive wager betting circle as this could be considered cheating by the casino. Once the bets are closed, the progressive wager made by the player is registered and is a live wager and would lose or win based on predetermined rules. If a player has not placed a progressive wager (chip) in the progressive wager betting circle and the dealer puts the table in the bets closed mode (by pressing bets closed button 502) then the player cannot then place a chip (progressive wager) on the progressive wager betting circle as this could also be considered cheating, but in any case such a "late bet" would not register with the system (e.g., none of the LEDS would light up for that player's bet administration unit indicating the player has placed a progressive wager as it was placed too late) and thus the player would not be entitled to win anything on the progressive wager. Before the dealer presses the "bets closed" button 502, the dealer would typically announce "bets closing" to the table so any players who desire to make a wager (main or progressive wager) but have not yet done so can still do so if they act quickly. A bets open button 501 is pressed after a game has ended and all players have had their wagers resolved, thus a new game begins and once the bets open button 501 is pressed, players can now place chips on their progressive wager betting circles which will now register with the system (the appropriate LED would light up).

A jackpot won button 503 is pressed if after a game is over, a player achieved a particular combination of cards (or dice, etc.) entitling that player to earn a progressive jackpot. As such, the dealer would press the jackpot won button 503 so that the system would allow the dealer to utilize a keyboard/keypad 504 in order to input into the system which player won the progressive jackpot, and optionally, what kind of progressive jackpot the player has won (some games can offer a progressive jackpot of 100% of the jackpot pool for the most unlikely combination and a lesser progressive jackpot of 10% (or other amount) of the jackpot pool for an easier to achieve combination).

Figure 6:
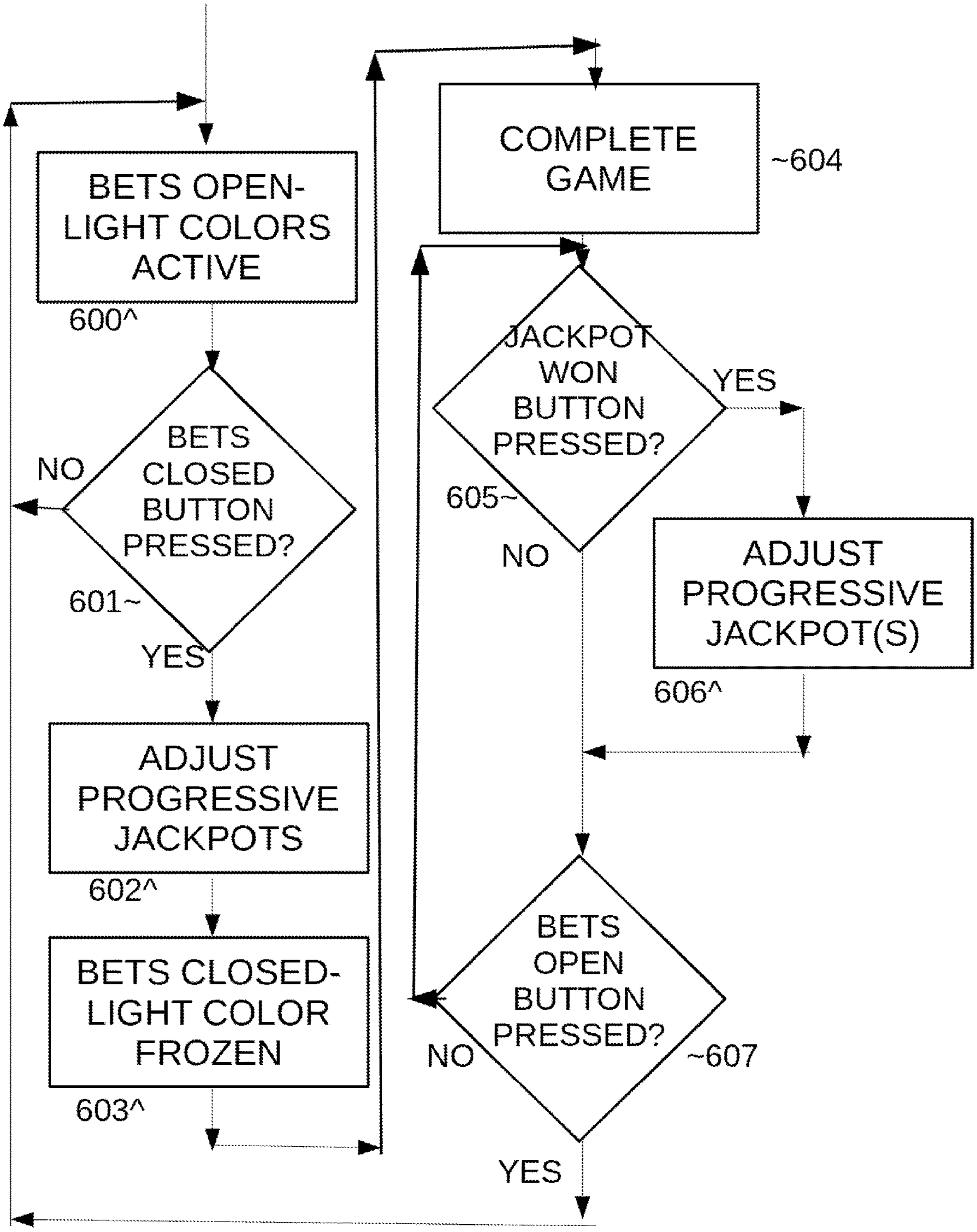
FIG. 6 is a flowchart illustrating an exemplary method of administering multi-level progressive wagers, according to an embodiment.

FIG. 6 is a flowchart illustrating an exemplary method of administering multi-level progressive wagers, according to an embodiment.

The method can begin with operation 600, wherein the table is in the "bets open" mode. This means players can place their wagers (main wagers, progressive wagers, etc.) The color sensors are active such that when a player places a chip on a progressive wager betting circle, the appropriate LED would illuminate reflecting the denomination of the chip that the player placed on the progressive wager betting circle. For example, if a red chip was placed in the progressive wager betting circle, then a red LED would light up near the progressive wager betting circle (for the same bet administration unit), and if a white chip was placed in the progressive wager betting circle, then a white LED would light up near the progressive wager betting circle (for the same bet administration unit). Thus, the same color LED would light up to match the color of the chip bet. Note that the "same color" does not necessarily mean exactly the same color, as no two different objects would have the exact same matching color. Rather, the same color in this context means that the color of the chip and the color of the LED are substantially similar (e.g., approximately). In other words, the hue of the LED and the hue of the chip would be within a predetermined tolerance (e.g., 30 degrees on a color wheel) to be considered approximately the same color (in other words the difference between the two hues would be less than 30).

If operation 600 is occurring after operation 607, then the LEDs become "unfrozen" and now the LEDs would illuminate accordingly to reflect whatever chip (if any) is placed in each progressive wager betting circle.

From operation 600, the method proceeds to operation 601, which checks whether the dealer has pressed the "bets closed" button 502. If not, then the method returns back to operation 600 which continues the "bets open" mode. Typically, the dealer will observe the table and when it looks like most or all players have completed placing their wagers, the dealer would announce "bets closing" (to encourage players to finish placing their bets) and thereafter (after a short delay) press the "bets closed" button 502.

If in operation 601, the dealer has pressed the "bets closed" button 502, then the method proceeds to operation 602, which adjusts progressive jackpots. It is determined which progressive wager betting circles have a wager (chip) placed therein. For those that have wagers, it is determined what the denomination of that wager is (e.g., $1 or $5). Note that other denominations can be used as well, for example, some casino use $0.50 chips, $0.25 chips, etc., so the system could differentiate between $0.50 and $1 wagers/chips. In another embodiment, there can be more than two possible progressive wagers, for example, a player could player $0.50, $1.00, and $5.00, and the system would identify the denomination of the wager (using the methods described herein) and address the progressive wager accordingly.

Figure 8:
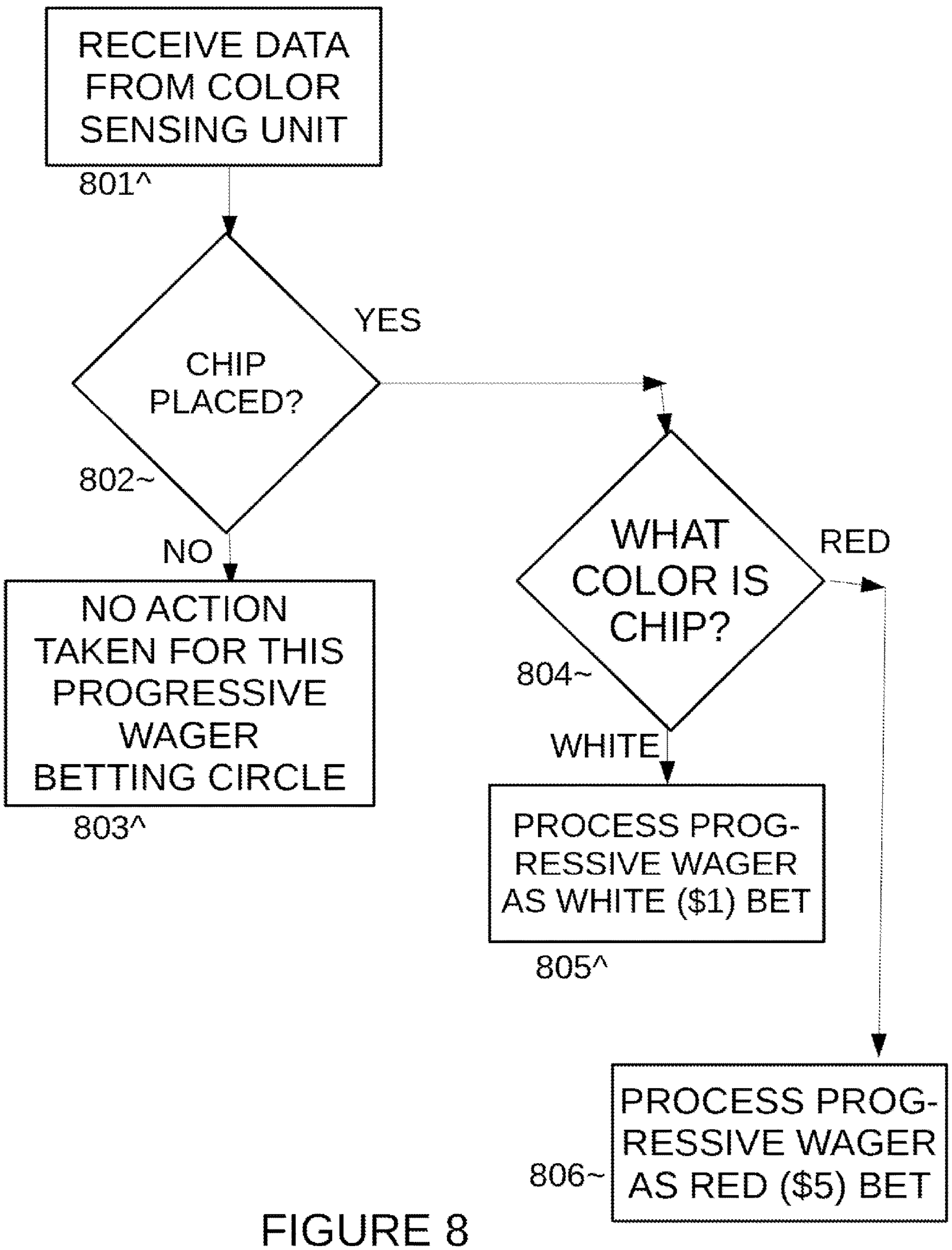
FIG. 8 is a flowchart illustrating an exemplary method of processing multi-level progressive wagers, according to an embodiment.

In operation 602, for each progressive wager made, it has been determined the amount of that wager (by utilizing the color sensors as described herein). FIG. 8 also illustrates in more detail operations which operation 602 comprises. The appropriate LEDs on the corresponding bet administration unit is lit up. For example, in an embodiment, if a white chip (e.g., $1) is placed on the progressive wager betting circle then only a white LED lights up on the bet administration unit (but not a red LED), and if a red chip (e.g., $5) is placed on the progressive wager betting circle then only a red LED lights up on the bet administration unit (but not the white LED). This is done for all of the bet administration units. For progressive wager betting circles that do not have a chip placed therein, typically no LED would light up on that corresponding bet administration unit.

In addition, the appropriate amount is added to the progressive jackpot pool(s). For example, in an embodiment which allows for two types of progressive wagers ($1 and $5), a $1 progressive jackpot pool and a separate $5 progressive jackpot pool can be maintained. For example, for each $1 wager on the progressive jackpot, $0.90 is added to the $1 progressive jackpot pool and $0.10 is kept by the casino as profit; and for each $5 wager on the progressive jackpot, $4.75 is added to the $5 progressive jackpot pool and $0.25 is kept by the casino as profit. All of the progressive wagers that were made at the table are processed in this manner.

From operation 602, the method proceeds to operation 603, in which the "bets closed" lamp 506 lights up. In addition, the LEDs that are lit for each bet administration unit are now frozen, that is, they would not change even if the chip placed in the corresponding progressive wager betting circle is removed. The dealer can optionally now collect all of the progressive wagers that were placed since the LEDs are frozen and inform everyone at the table (including the dealer) which players made the progressive wager and for how much.

From operation 603, the method proceeds to operation 604, which completes the game. The dealer deals all cards out as needed, players make any decisions as needed, and the game is completed. The dealer would resolve all wagers (take player losing wagers and pay player winning wagers) and the dealer can also pay any payouts which are not from any progressive jackpot pool on the progressive wager (in an embodiment, the progressive wager may have fixed payouts which are not taken from a progressive jackpot pool).

From operation 604, the method proceeds to operation 605, which determines whether the jackpot won button 503 has been pressed. If any player at the table is entitled to a payout from one or more progressive jackpot pool(s), which would mean the player made the progressive wager and hit an unlikely combination entitled the player to such a payout, then the dealer would press the jackpot won button 503, so the dealer can pay the winning player(s) from the progressive jackpot pool(s). If no such progressive jackpot has been won, then the dealer would not press the jackpot won button and the method would proceed to operation 607.

In operation 607, it is determined whether the dealer pressed the bets open button 501. The dealer would press this button when the game is completed and the players should begin placing new wagers for a successive game. If the bets open button 501 is pressed, then the method proceeds to operation 600 and a new sequence can begin.

If in operation 607, the bets open button 501 is not pressed, then the method returns to operation 605, which continues to determine whether the jackpot won button 503 is pressed.

In operation 605, if the jackpot won button 503 is pressed (this would typically be a rare occurrence), then the method proceeds to operation 606, which adjusts the progressive jackpot(s). At least one of the players at the same table has won an entire progressive jackpot pool or a portion (less than 100%) of the progressive jackpot pool. This would typically be a large amount of money and would typically be paid to the player by check (as the dealer may not have enough chips to make such payment). The dealer would utilize the keyboard/keypad 504 to identify to the system what kind of progressive jackpot was one (e.g., 100% of the pool, 10% of the pool, etc., and identify which pool if there is more than one pool). Typically, the bet detection and administration system does not know what cards were dealt and so the dealer would have to identify how many progressive jackpots were won by players and what type (if there are more than one possible type of win). The system would then reduce the amount of the progressive jackpot pool accordingly (for example, if a player won 100% of the progressive jackpot pool then the system would "reseed" the progressive jackpot pool at a predetermined minimum seed amount (e.g., $5,000). The casino personnel would ensure the player was paid his/her progressive jackpot (e.g., by check, cash, wire transfer, etc.) Once the progressive jackpot wins have all been identified to the system and the system has adjusted the totals of all progressive jackpot pool(s), then the method can proceed to operation 607 which waits for the bets open button to be pressed so new wagering (and hence a new game) can begin. From operation 606, it is not logical for the dealer to press the jackpot won button 503 again and hence after operation 606, only the bets open button 501 would be active.

Figure 7:
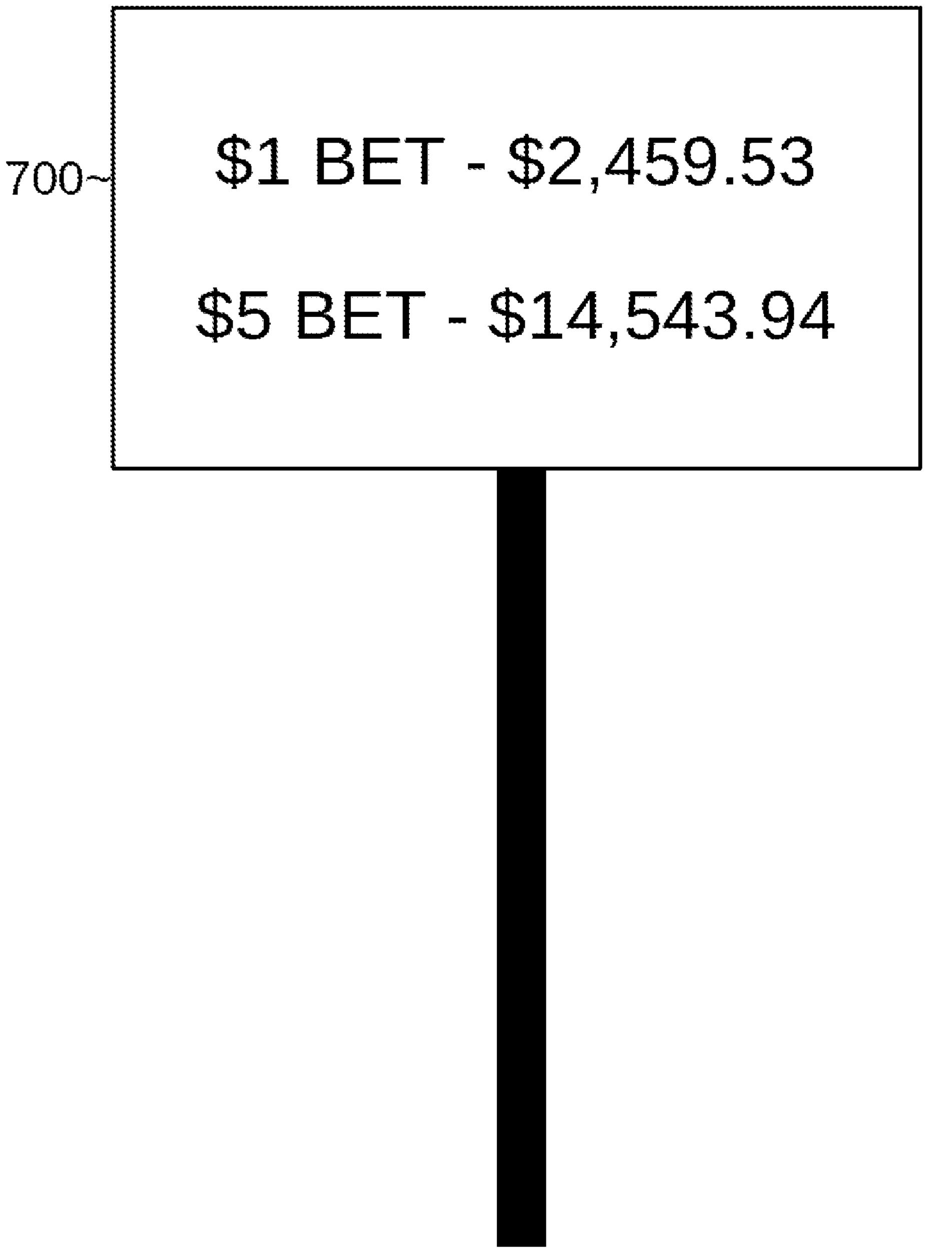
FIG. 7 is a drawing showing a progressive jackpot display, according to an embodiment.

FIG. 7 is a drawing showing a progressive jackpot display, according to an embodiment.

A progressive jackpot display is a display or sign that can be attached to the casino table. In some embodiments, a progressive jackpot pool(s) is shared among a plurality of different tables and each table would have such a sign, but the amounts displayed therein would be identical since the different tables would be sharing the same jackpot pool(s).

In this particular example, there are two separate jackpot pools a $1 progressive jackpot pool (also referred to as $1 jackpot pool) for $1 progressive jackpot wagers and a $5 progressive jackpot pool (also referred to as $5 jackpot pool) for $5 progressive jackpot wagers. Table II below illustrates one example of a paytable (for a progressive wager but not for a main wager) that can be used for the system described herein, with both a $1 progressive wager and a $5 progressive wager available. The "hand" column represents a random five card hand dealt to each player. Of course, the winning hands and payouts therein are merely examples, and many other such paytables can be devices for a progressive jackpot wager. Note that the non-progressive jackpot pool payouts (e.g., for the Full House) are optional and in an embodiment the progressive wager paytable can consist of only progressive jackpot pool payouts. Note that conditions (e.g., winning hands on the paytable such as a royal flush or four of a kind) that result in a payout from a progressive jackpot pool are considered triggers.

TABLE II

| Hand | $1 progressive wager | $5 progressive wager |
|---|---|---|
| Royal flush | 100% of $1 jackpot pool | 100% of $5 jackpot pool |
| Four of a kind | 10% of $1 jackpot pool | 15% of $5 jackpot pool |
| Full house | $100 | $500 |

Thus, for example, given the values from the sign shown in FIG. 7, if the player did not make a progressive wager bet and gets four of a kind, the player would not win any payout as shown in Table II (although the player may still be entitled to a winning payout on his/her main wager according to the rules for the main game). If the player made a $1 progressive wager and got the four of a kind, then the player would be entitled to 10% of the $1 jackpot pool or $245.95 (and the $1 jackpot pool would be reduced by this amount to be $2,213.58). If the player made a $5 progressive wager and got the four of a kind, then the player would be entitled to 15% of the $5 jackpot pool, or $2,181.59 (and the $5 jackpot pool would be reduced by this amount to $12,362.35). Players at the same table are free to choose not to play the progressive wager, or can choose their preferred denomination (choose among $1 and $5).

Note that each time operation 602 is implemented, the progressive jackpot pool(s) shown will gradually increase as progressive wagers are registered.

FIG. 8 is a flowchart illustrating an exemplary method of processing multi-level progressive wagers, according to an embodiment. FIG. 8 illustrates operations that can be performed during operation 602 of FIG. 6. FIG. 8 is performed separately for each bet administration unit at the table. Note that the method illustrated in FIG. 8 is just one example embodiment which uses two denominations, white chips and red chips, although other denominations can be used as well.

In operation 801, data is received from the color sensing unit. This data can come in many forms, but ultimately the data represents whether a chip was placed in the progressive wager betting circle and what color it is. Responsive to this data, the colored lights for that bet administration unit lights up the appropriate LED (see Table I).

From operation 801, the method proceeds to operation 802, which determines whether a chip is placed in the progressive wager betting circle. If not, then the method proceeds to operation 803, as there is nothing more that needs to be done for this particular bet administration unit/progressive wager betting circle.

If in operation 802, it is determined that a chip was placed therein, then the method proceeds to operation 804, which determines what color the chip is that was placed therein.

If in operation 804, it is determined that a white colored chip was placed therein, then the method proceeds to operation 805 and processes the progressive wager as a white ($1) wager. This can be done in a number of ways, depending on how the different progressive wager amounts are being implemented.

If in operation 804, it is determined that a red colored chip was placed therein, then the method proceeds to operation 806 and processes the progressive wager as a red ($5) wager. This can be done in a number of ways, depending on how the different progressive wager amounts are being implemented, but would always be different than how the white ($1) wager was processed.

One way the different progressive wager denominations can be implemented is using a separate progressive jackpot pool for each different denomination that the progressive wager can be. In this way, players who choose to bet more on the progressive wager (e.g., $5) will get rewarded by having a chance to win from a (larger) $5 progressive jackpot pool than players who only bet $1 on the progressive wager (who will only win their progressive payout from a $1 progressive jackpot pool). The $5 progressive jackpot pool would typically be seeded (the initial value) higher than the $1 progressive jackpot pool, so for example the $5 progressive jackpot pool could start at $25,000 (which would go up from there until it is hit) while the $1 progressive jackpot pool could start at $5,000 (which would go up from there until it his hit). If separate progressive jackpot pools are maintained, then the progressive wager made would be contributed to the respective progressive jackpot pool. For example, if a $1 (white chip) progressive wager is made, then (assuming 90% of the wager is contributed to the respective progressive jackpot pool) then $0.90 would be automatically contributed to the $1 progressive jackpot pool, while if a $5 (red chip) progressive wager is made then $4.50 would be automatically contributed to the $5 progressive jackpot pool. The portion not contributed (e.g., $0.10 for a white chip progressive wager and $0.50 for a red chip progressive wager) to the pools is kept by the house. Different players at the table can thus make different progressive wagers of different denominations during the same round of play with each player contributing to (and potentially winning from) whichever respective progressive jackpot pool corresponds to the denomination (color) of the progressive wager they have made (hence different progressive jackpot pools could be utilized at the same table on a same round of a game).

In another embodiment, there can be only one progressive jackpot pool but each different denomination of the progressive jackpot wager would entitle the player to a proportional share of that progressive jackpot upon winning a progressive award. For example, assuming the progressive jackpot pool is $10,000. A player who wagers $5 would trigger a payout of 100% of the jackpot pool ($10,000) upon getting a particular (highest) hand (and then the jackpot pool would be reseeded to a predetermined amount). If a player wagers $1 on the progressive jackpot pool and gets the particular hand then he/she would win 20% of the entire jackpot pool or $2,000 (meaning $8,000 is left in the jackpot pool). So basically, a $1 bettor on the progressive wager would earn 20% ($1/$5) of whatever a $5 bettor would win from the progressive jackpot based on the same hand. As such, the player who bets $5 on the progressive jackpot would win five times more for the same hand (progressive jackpot trigger) than a player who bets $1 on the progressive jackpot. In this embodiment (where this is only one progressive jackpot pool), regardless of the denomination of the progressive wager, they would all be contributed to the same progressive jackpot pool (e.g., 90% (or other amount) of the progressive wager amount would be added to the progressive jackpot pool).

Figure 9:
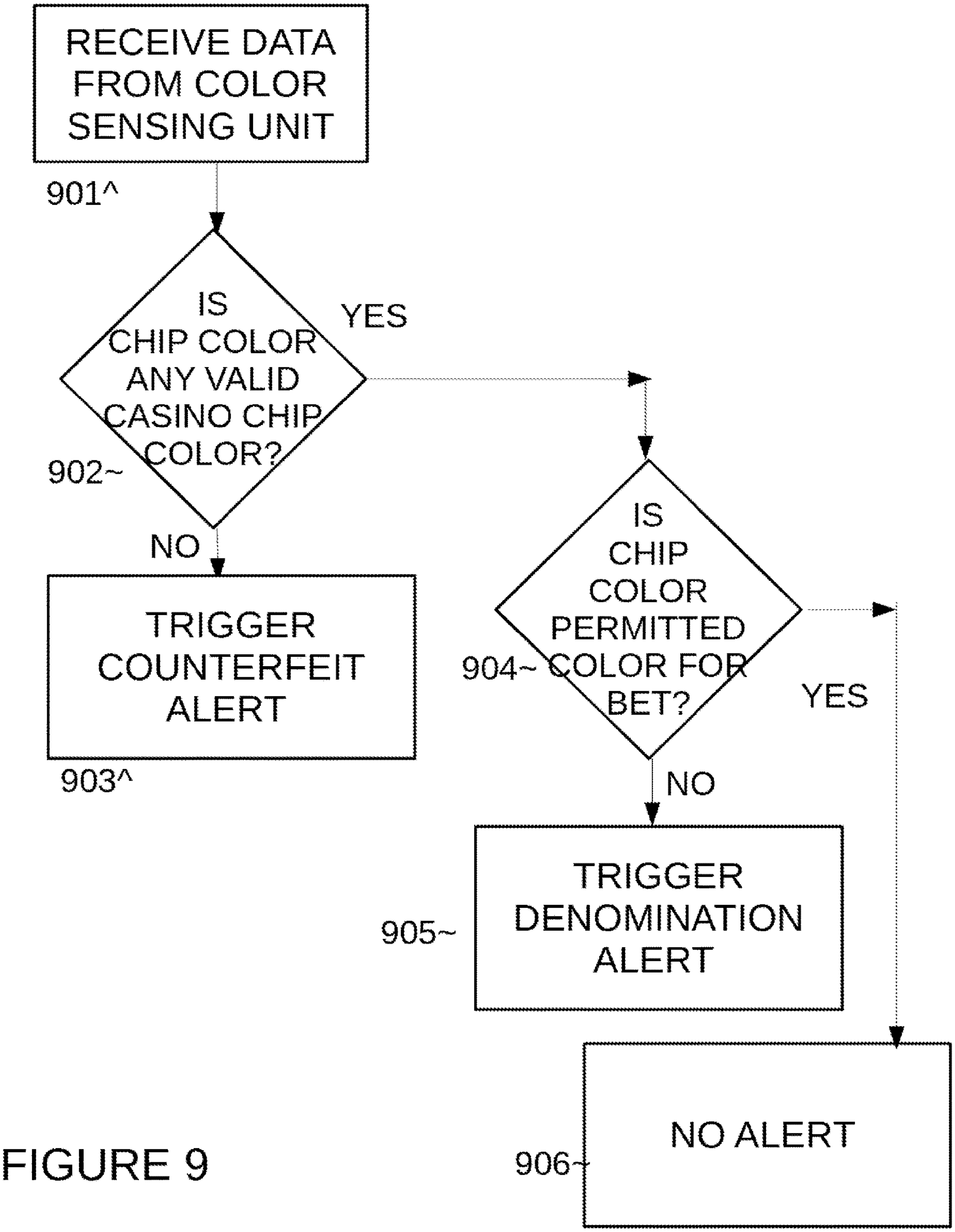
FIG. 9 is a flowchart illustrating an exemplary method of counterfeit chip detection, according to an embodiment.

FIG. 9 is a flowchart illustrating an exemplary method of counterfeit chip detection, according to an embodiment. Typically, the method in FIG. 9 would continue repeatedly in order process chips placed therein.

As described herein, data from the color sensing unit (color sensor) unit is received (e.g., by the processing unit 100).

From operation 901, the method proceeds to operation 902, which determines if the chip color of the detected chip (from operation 901) is any valid casino chip color issued by this casino (the same casino where the table housing the equipment is located). This can be done as described herein.

If the result from the determination in operation 902 is no, that is, the color of the chip placed cannot be any chip issued by this casino (e.g., the color therein is not a possible shade of red, green, white, etc., that this casino issues), then the method proceeds to operation 903 which triggers a counterfeit alert. A message (e.g., text, phone call, email, etc.) is transmitted (which includes an identification of the table and the betting circle which identified the counterfeit chip) to particular personnel at the casino (e.g., pit boss, security, cashier, etc.) to identify there is a detected counterfeit chip. The light ring may or may not light up a special color/pattern to indicate a counterfeit chip, depending on the embodiment. In an embodiment, a counterfeit alert cannot be removed simply by removing the (detected as) counterfeit chip, so if a special pattern on the light ring lights up for a counterfeit alert it will not go away once the counterfeit chip is removed.

If the result from the determination in operation 902 is yes, that is, the color of the chip placed is determined to be a valid chip issued by this casino, then the method proceeds to operation 904. In operation 904, it is determined if the chip color (denomination) placed is permitted for the particular betting circle it was placed on (based on casino rules). This can be done as described herein. For example, if only white and red chips are permitted on the progressive wager betting circle, then if a player places a green chip this would not be a permitted color (denomination).

If in operation 904, it is determined that the chip placed is not a permitted color (denomination) for the particular bet therein, then the method proceeds to operation 905, which triggers a denomination alert (meaning the player placed the incorrect type (color) of chip on the betting circle). The light ring for that betting circle would flash a particular color, pattern, etc., to indicate a denomination alert. Note that in case of a denomination alert, the wager (of the wrong denomination) placed therein would not trigger the progressive wager for that particular player. Thus, if the places the wrong color chip (e.g., green when only white/red chips are allowed) then the player would not be entered into the progressive jackpot. This means that if the issue is not corrected (the player does not remove the chip of the wrong denomination) and replace it with a correct one, then even if the player wins the progressive jackpot, the player would not be entitled to any award. Typically, when the denomination alert occurs (e.g., the respective light ring glows, flashes, etc.) the player would remove the incorrect chip placed therein and place a correct one (of an acceptable denomination to play the particular wager). Once a correctly colored chip is placed therein, the denomination alert would go away and the light ring would light up normally to reflect a proper bet (e.g., light up white for a white chip, light of red for a red chip, etc.) If the player removed the incorrect chip (of the wrong color/denomination), then the denomination alert would typically go away (the light ring would stop lighting up to indicate the incorrect denomination or would not light up at all or light up as the light ring would normally behave had such wrong chip not been placed therein).

If in operation 904, the chip color detected is permitted for the bet, then the method proceeds to operation 906, wherein no alert (counterfeit and denomination) is generated and play proceeds normally.

Figure 10A:
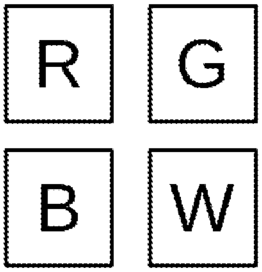
FIG. 10A is a drawing illustrating an RGBW LED, according to an embodiment.

FIG. 10A is a drawing illustrating an RGBW LED, according to an embodiment. FIG. 10A shows a prior art RGBW LED.

Shown are 4 adjacent LEDs (a white LED, a red LED, a blue LED, and a green LED) in close proximity. By varying the strength of each individual LEDs, colors for the overall RGBW LED can be formed.

Figure 10B:
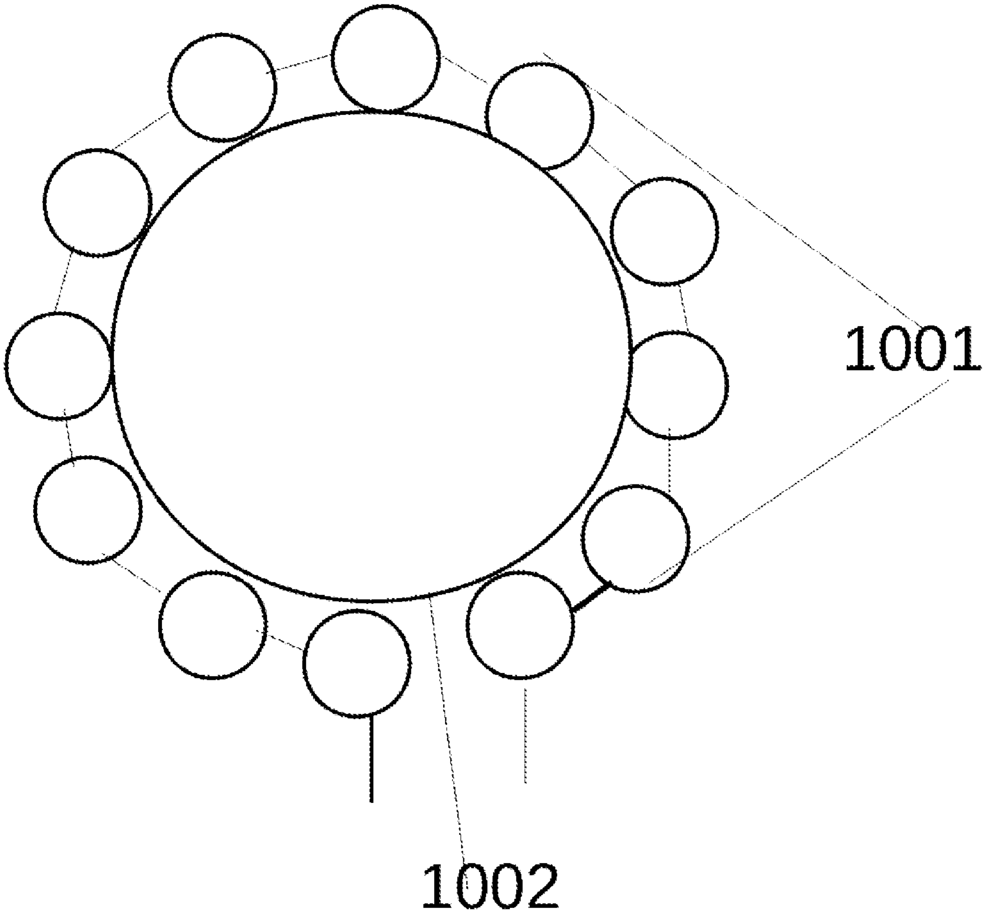
FIG. 10B is a drawing illustrating a light ring, according to an embodiment.

FIG. 10B is a drawing illustrating a light ring, according to an embodiment. The light ring shown is prior art.

A strip/string of RGBW LEDs (or just RGB LEDs) can be formed in a light ring 1001 (ring 1001 encompasses all 12 shown RGBW LEDs and their connections). Betting circle 1002 (e.g., progressive wager betting circle 450) is inside the light ring 1001 although the betting circle 1002 can be outside the light ring 1002 as well. The light ring 1001 can be controlled by the processing unit 100 and the color of each individual RGBW LED can be controlled to create a variety of effects (solid color, glowing, blink, a color that continuously rotates around the ring, etc.) The light ring 1000 can be the colored lights (e.g., the colored light unit). There would be one such light ring 1000 for each progressive wager betting circle (see FIG. 4A, these are the betting circles labeled "side").

Figure 11:
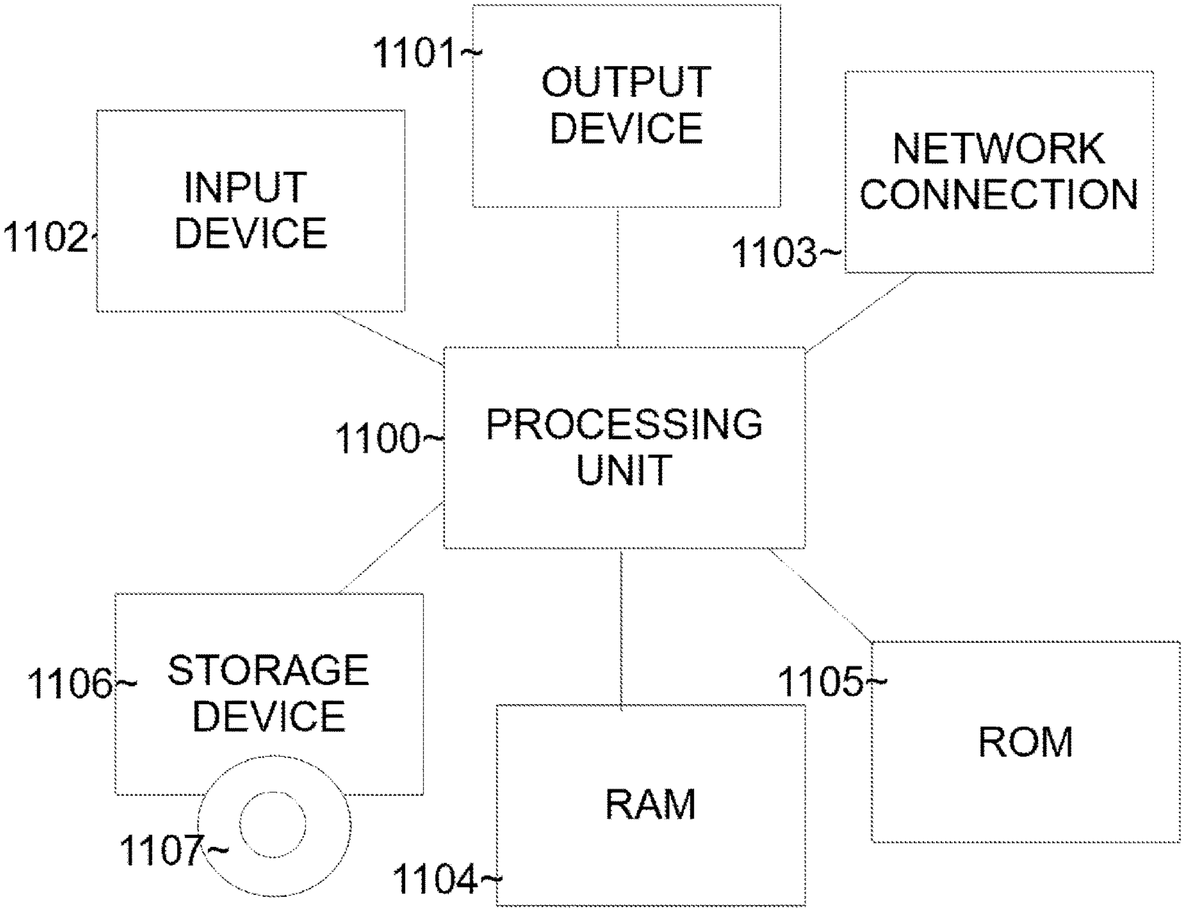
FIG. 11 is a block diagram illustrating hardware that can be used to implement computers which can cooperate to implement any and all of the methods/features described herein.

FIG. 11 is a block diagram illustrating hardware that can be used to implement computers which can cooperate to implement any and all of the methods/features described herein. Such computers can be a casino database, progressive jackpot server, or any computer which may play a role in implementing the overall system described herein.

A processing unit 1100 (such as a microprocessor and any associated components) is connected to an output device 1101 (such as an LCD monitor, touch screen, CRT, etc.) which is used to display to the player any aspect of the method, and an input device 1102 (e.g., buttons, a touch screen, a keyboard, mouse, etc.) which can be used to input from the user any decision/parameter from the user All methods described herein can be performed by the processing unit 1100 by loading and executing respective computer readable instructions. The processing unit 1100 can also be connected to a network connection 1103, which can connect the electronic gaming device to a computer communications network such as the Internet, a LAN, WAN, etc. The processing unit 1100 is also connected to a RAM 1104 and a ROM 1105. The processing unit 1100 is also connected to a storage device 1106 which can be a DVD-drive, CD-ROM, flash memory, etc. Multiple such processing units can also work in collaboration with each other (in a same or different physical location). A non-transitory computer readable storage medium 1107 can store a program which can control the electronic device to perform any of the methods described herein and can be read by the storage device 1106.

While one processing unit is shown, it can be appreciated that one or more such processor can work together (either in a same physical location or in different locations) to combine to implement any of the methods described herein. Programs and/or data required to implement any of the methods/features described herein can all be stored on any non-transitory computer readable storage medium (volatile or non-volatile, such as CD-ROM, RAM, ROM, EPROM, microprocessor cache, etc.)

While progressive wager betting circle is used herein, it can be appreciated that "betting circle" is just a term of art and it can refer to an area of any shape intended for bets to be placed. Any betting circle described herein can be any other shape, such as square, rectangle, triangle, etc.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. An apparatus, comprising:

a plurality of bet administration units, each bet administration unit out of the plurality of bet administration units comprising a color sensing unit configured to detect a presence of a chip therein in the respective bet administration unit and color values of the chip therein, and a colored light unit configured to selectively display a first color and a second color;

at least one processing unit connected to the plurality of bet administration units, the at least one processing unit configured to read and execute computer readable instructions stored on a computer readable storage medium, the computer readable instructions programmed to:

for each of the plurality of bet administration units, when the chip therein is detected, use the color values to implement a first progressive jackpot protocol when the chip therein is a third color and implement a second progressive jackpot protocol when the chip therein is a fourth color, wherein the apparatus is further configured such that the color values are analyzed using a mathematical color definition to determine a chip color the chip therein is from a color set comprising the third color and the fourth color.

2. The apparatus as recited in claim 1, wherein the at least one processing unit is further programmed such that each of the plurality of bet administration units operates such that the colored light unit is configured to display the first color when the chip color is the third color and configured to display the second color when the chip color is the fourth color.

3. The apparatus as recited in claim 2, wherein the first color is approximately a same color as the third color, and the second color is approximately a same color as the fourth color.

4. The apparatus as recited in claim 1, wherein the first color is white and the second color is red, and the third color is white and the fourth color is red.

5. The apparatus as recited in claim 1, wherein the computer readable instructions are further programmed such that the first progressive jackpot protocol uses a first progressive jackpot pool and the second progressive jackpot protocol uses a second progressive jackpot pool different from the first progressive jackpot pool.

6. The apparatus as recited in claim 5, wherein the computer readable instructions are further programmed such that the first progressive jackpot pool is reseeded at a higher amount after the first progressive jackpot pool is won than the second progressive jackpot pool after the second progressive jackpot pool is won.

7. The apparatus as recited in claim 1, wherein a chip of the third color is higher in value than a chip of the fourth color, and the computer readable instructions are further programmed such that the second progressive jackpot protocol pays a lower amount out of a progressive jackpot pool than the first progressive jackpot protocol for identical progressive jackpot triggers.

8. The apparatus as recited in claim 7, wherein the lower amount is computed based on a value of the chip of the fourth color divided by a value of the chip of the third color.

9. The apparatus as recited in claim 1, wherein the computer readable instructions are further programmed to trigger an alert when the chip color is not an acceptable color.

10. A method, comprising:

operating a plurality of bet administration units, each bet administration unit out of the plurality of bet administration units comprising a color sensing unit configured to detect a presence of a chip therein in the respective bet administration unit and color values of the chip therein, and a colored light unit configured to selectively display a first color and a second color; performing on at least one processing unit:

for each chip that is placed in a respective one of each of the plurality of bet administration units, determining a respective chip color using a mathematical color definition from a color set comprising a third color and a fourth color, determining to select between a first progressive jackpot protocol and a second progressive jackpot protocol based upon the respective chip color and implementing the selected progressive jackpot protocol.

11. The method as recited in claim 10 wherein the first progressive jackpot protocol is implemented when the respective chip color is the third color, and the second progressive jackpot protocol is implemented when the respective chip color is the fourth color.

12. The method as recited in claim 11, wherein on each of the plurality of bet administration units, using a color set comprising the first color and the second color; and selectively illuminating a displayed color selected from the color set based on the respective chip color.

13. The method as recited in claim 12, wherein the selectively illuminating is based upon a provided illumination protocol which comprises that the first color illuminates when the respective chip color therein is the third color, and the second color illuminates when the respective chip color is the fourth color.

14. The method as recited in claim 11, wherein the first color is approximately a same color as the third color, and the second color is approximately a same color as the fourth color.

15. The method as recited in claim 11, wherein the first color is white and the second color is red, and the third color is white and the fourth color is red.

16. The method as recited in claim 10, wherein the first progressive jackpot protocol uses a first progressive jackpot pool and the second progressive jackpot protocol uses a second progressive jackpot pool different from the first progressive jackpot pool.

17. The method as recited in claim 16, wherein providing reseeding protocols which provide that the first progressive jackpot pool is reseeded at a higher amount after the first progressive jackpot pool is won than the second progressive jackpot pool after the second progressive jackpot pool is won.

18. The method as recited in claim 11, wherein a chip of the third color is higher in value than a chip of the fourth color, and the second progressive jackpot protocol pays a lower amount out of a progressive jackpot pool than the first progressive jackpot protocol for identical progressive jackpot triggers.

19. The method as recited in claim 18, wherein the lower amount is computed based on a value of the chip of the fourth color divided by a value of the respective chip of the third color.

20. The method as recited in claim 10, further comprising determining that the respective chip color is not an acceptable color and in response to the determining, triggering an alert.

* * * * *